United States Patent [19]

Carpenter et al.

[11] 4,311,466
[45] Jan. 19, 1982

[54] AUTOMATED AIRCRAFT RADIO NAVIGATION SIMULATOR

[75] Inventors: Dennis O. Carpenter, Bothell; Robert E. Ceola, Auburn, both of Wash.

[73] Assignee: The Boeing Company, Seattle, Wash.

[21] Appl. No.: 50,409

[22] Filed: Jun. 20, 1979

[51] Int. Cl.³ ............................ G09B 9/08; G01S 7/40
[52] U.S. Cl. .................................... 434/242; 364/578; 434/243
[58] Field of Search ............... 364/578, 580; 343/17.7, 343/106 R; 434/239, 242, 243

[56] References Cited

U.S. PATENT DOCUMENTS

| | | | |
|---|---|---|---|
| 3,358,284 | 12/1967 | Millar et al. | 343/106 R |
| 3,665,086 | 5/1972 | Magee et al. | 434/242 |
| 3,982,244 | 9/1976 | Ward et al. | 343/17.7 |
| 4,019,183 | 4/1977 | Haynes | 434/239 |
| 4,034,483 | 7/1977 | Bernstein | 434/9 |
| 4,134,217 | 1/1979 | Neilson | 434/242 |
| 4,163,234 | 7/1979 | Beno et al. | 343/17.7 |

Primary Examiner—Felix D. Gruber
Attorney, Agent, or Firm—James P. Hamley; B. A. Donahue

[57] ABSTRACT

Aircraft navigation testing apparatus includes circuitry which produces digital signals on an output bus corresponding to a desired simulation of aircraft glideslope, localizer and very high frequency, omnidirectional (VOR) positions. Localizer and glideslope circuitry respond to the signal on the bus to produce the desired final value signal at the dictated rate. VOR circuitry responds by activating selected switches in a switchbank, thereby programing a conventional VOR generator to produce the VOR signal at the desired rate.

22 Claims, 12 Drawing Figures

AUTOMATED AIRCRAFT RADIO NAVIGATION SIMULATOR

BACKGROUND OF THE INVENTION

The present invention pertains to the automatic signal simulator art and, more particularly, to a fully automated aircraft radio navigation simulation system.

The aviation industry has developed a specific set of standard radio frequency navigation signals generated by ground stations which an aircraft can process to determine its relative position. Such signals are used not only for general navigation purposes but also to allow instrument landing of aircraft under adverse weather conditions.

One such signal is a very high frequency, omnidirectional (VOR) guidance signal. The VOR signal is comprised of a carrier selected between 108 and 116.5 megahertz modulated with 30 hertz and 9.96 kilohertz signals. The VOR signal is radiated in all directions from the transmitter site, with each radial radiated line containing a predetermined phasing of the two tones. Thus, an aircraft in receiving the VOR signal can determine its position relative to the transmitting site by detecting the relative phasing of the tones on the carrier and using a "lookup" table to determine the relative position indicated by that tone phasing.

Also commonly transmitted from ground sites are marker beacons. A marker beacon is a tone of selected frequency which modulates a 75 megahertz carrier. The frequency of the tone indicates to the aircraft the distance of the aircraft from a given geographical point. Thus, a 400 hertz tone might be used to indicate that the aircraft is two miles from a city, a 1300 hertz tone that it is one mile from the city, and so forth.

Upon approach to an airport, localizer and glideslope signals are commonly provided. The localizer signal is generally comprised of a carrier selected between 108.1 to 111.9 megahertz which is modulated by 90 and 150 hertz tones. The localizer signal is radiated from the ground site such that if the aircraft is to the right of a desired flight path it receives a higher proportion of the 150 hertz tone and if it is off to the left it receives a higher proportion of the 90 hertz tone. The sum of the amplitudes of the two tones always remains a constant, with the proportion determining the left/right relative position of the aircraft with respect to the runway center line.

The glideslope signal is comprised of a carrier selected between 327 and 337 megahertz, also modulated by 90 and 150 hertz tones. As with the localizer signal, the sum of the amplitudes of the two tones is always a constant. Here, however, the relative proportion of each tone to the sum of the two is indicative of the vertical glide path of the aircraft with respect to a desired vertical glide path. Thus, if the craft is above a desired vertical glide path it receives a higher proportion of the 150 hertz tone and if it is too low it receives a higher proportion of the 90 hertz tone.

As may be appreciated, it is extremely important, particularly in commercial aviation, that an aircraft's radio navigation avionics be functioning and be properly calibrated. The procedure for testing and calibrating an aircraft's navigational avionics known to the prior art is both tedious and time consuming. An operator locates a generator which is capable of generating any of the desired navigational signals in the vicinity of the antenna of the aircraft to be tested. The operator then sets mechanical switches on the generator causing it to simulate a desired signal. Thus, to simulate a VOR signal an operator sets thumbwheel switches corresponding to a relative angle with respect to a simulated ground site. Marker beacons are generated by manually throwing toggle switches which cause an appropriate tone to be generated. Glideslope and localizer signals are mechanically set on potentiometers. Signals of 90 hertz, and 150 hertz, each at a fixed level, are applied to opposite ends of the potentiometers. Thus, by appropriate positioning of the potentiometer's tap, the two signals may be combined in any desired proportion, with the amplitude of the sum of the two signals always being a constant.

Not only does the above process of testing an aircraft's navigational avionics involve a substantial amount of time to perform, while being subject to human error, but also an operator cannot set the switches at a rate to exactly simulate the rate at which such navigational signals would be encountered in the normal operation of an aircraft. Thus, the above testing procedure is inherently incomplete.

SUMMARY OF THE INVENTION

It is an object of this invention, therefore, to provide a means for automatically simulating aviation navigation signals.

It is a further object of this invention to provide the above simulator which is capable of generating the navigation signals at a rate which is comparable to the rate at which such signals would normally be received by an aircraft in actual operation.

It is a particular object of the invention to provide the above described simulator for use in testing aircraft navigational equipment.

Briefly, according to the invention, apparatus is provided which automatically simulates the glideslope, localizer and very high frequency, omni-directional (VOR) guidance signals normally received by an aircraft. The apparatus includes a computer control which is programable to produce digital signals representative of: (a) a desired final glideslope value and the rate at which said final glideslope value should be approached, (b) a desired final localizer value and the rate at which said final localizer value should be approached, and (c) a desired final VOR value and the rate at which said final VOR value should be approached. Glideslope circuitry includes means to receive digital signals representative of the glideslope final value and of the rate at which the final value should be approached and further means which respond to the received signals to generate the desired final value at the desired rate. Localizer circuitry includes means to receive the digital signals representative of the final localizer value and of the rate at which the final localizer value should be approached and further means responsive to the received signals to generate the desired final value at the desired rate. VOR circuitry includes means to receive the digital signals representative of the final VOR value and the rate at which the final VOR value should be approached.

Preferably, the computer control communicates to the glideslope circuitry, localizer circuitry and VOR circuitry on a common bus. Each of the various circuitry is assigned a predetermined address which the computer uses to route desired final values and rates to each of the circuits.

DETAILED DESCRIPTION OF THE PREFERRED EMBODIMENTS OF THE INVENTION

Figure 1:
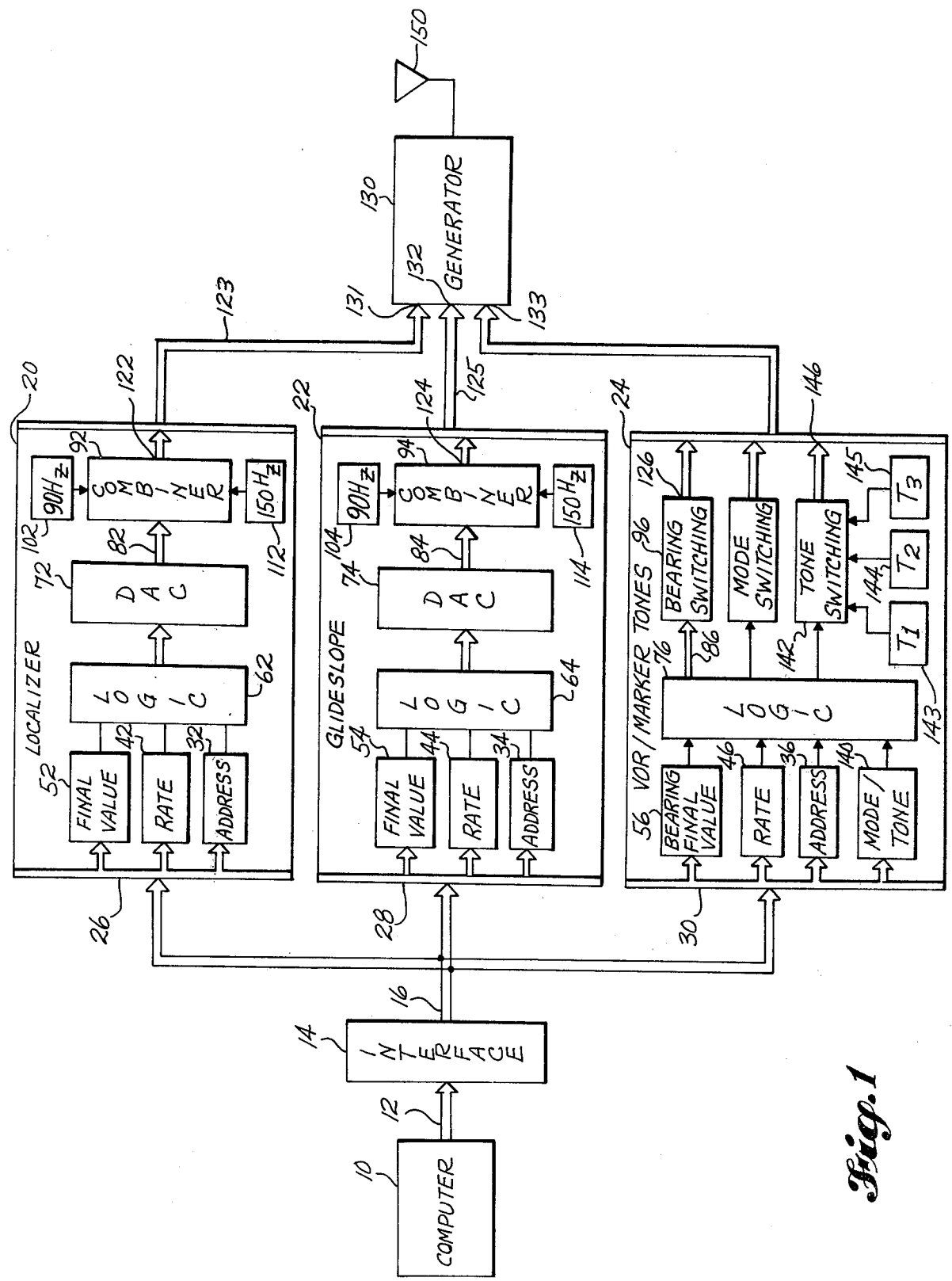
FIG. 1 is a block diagram illustrating the topology of the preferred embodiment of the instant radio navigation simulation apparatus.

FIG. 1 is a block diagram illustrating the topology of the preferred embodiment of the invention. A computer 10, in accordance with its programing, creates signals on its output bus 12 which, when coupled to the remaining portions of the system, results in the generation of particular signals at desired rates. Preferably, computer 10 is comprised of a commercially available Hewlett Packard type 9845 computer. The output bus 12 for the type 9845 computer is comprised of sixteen lines, eight containing data and eight of control. Given the information herein below, and the fact that the purpose of the system is to generate aircraft radio navigational signals to test an aircraft's radio navigation system, the programing of computer 10 would be obvious to anyone of ordinary skill in this art. It should also be noted that computer 10 could be appropriately programed such that the various signals generated precisely simulate the signals encountered by an aircraft in flight. Thus, the computer is capable of activating the various signals, at a prescribed rate to simulate any desired set of conditions which an aircraft might actually experience.

The output bus 12 of computer 10 is fed to an interface circuit 14. Interface 14, which is preferably a commercially available Fairchild Model 4880 interface unit, decodes the data lines on bus 12 into 40 output lines on its output bus 16.

The 40 line output bus 16 is fed in parallel to each of three circuits including a localizer circuit 20, a glideslope circuit 22 and a very high frequency, omnidirectional (VOR)/marker tone circuit 24. For purposes of illustration, the bus 16 is shown feeding to connectors 26, 28 and 30 of the respective boards 20, 22 and 24. Each of the circuits 20, 22 and 24 shares in common the fact that each includes an address register 32, 34 and 36, rate registers 42, 44 and 46 and final value registers 52, 54 and 56, respectively. Each of these components within any one circuitry block connect to the same lines of the bus 16. Thus, for example, the address registers 32, 34 and 36, in the preferred embodiment of the invention, all connect to lines 3-6 of the 40 line bus 16. The rate registers 42, 44 and 46 all connect to lines 11-18 of the 40 line bus 16 and, the final value registers 52, 54 and 56 all connect to lines 19-30 of the 40 line bus, with the VOR/marker tone circuit tone also being connected to lines 31 and 32.

The computer 10 accesses a particular one of the circuits 21, 22 and 24 by outputting an appropriate address on output bus 12 which, correspondingly, becomes a predetermined sequence on lines 3-6 of bus 16. Thus, if the computer wishes to access localizer circuit 20 it might produce a signal which, on lines 3-6 of bus 16 is 0001. The address of the glideslope circuit 22 may be assigned 0010 and that of the VOR/marker tone circuit 24 as 0101. Unless one of the circuitry blocks receives its address, it will not respond to further commands from the computer.

The localizer circuit 20, which is more fully described herein below with respect to FIGS. 2A to 2C, operates as follows. Upon receiving an appropriate address at its address register 32, the localizer circuit 20 enters into its logic circuit 62 both the final value from its final value register 52 and the rate at which the final value should be approached from its rate register 42. Contained within the logic circuit 62 is the previous localizer value and, as such, the localizer logic 62 digitally increments from its previous value to the final value, as determined by final value register 52, at the rate determined by the rate register 42. In the process of incrementing from the initial value to the final value the logic circuit 62 goes through a digital transition which, via a conventional digital to analog circuit 72, results in a corresponding analog signal at the converter's output 82. This control signal from the converter's output 82 is fed to the control input of a combiner circuit 92. Also fed to combiner circuit 92 is a 90 hertz tone, here represented as originating from block 102 and a 150 hertz tone originating from block 112. Each of the two tones is at some predetermined level. The combiner circuit, in response to the signal at its control input on line 82, combines the 90 hertz and 150 hertz tones in predetermined proportions such that the sum of the amplitudes of the two tones is always constant. This combined signal, which is seen to be the information on the conventional localizer signal, is produced at an output 122 which is fed via a line 123 to the first input 131 of a generator 130.

The glideslope circuit 22 operates identically to the localizer circuit 20 such that when it receives its proper address on address register 34 its logic circuitry 64 responds by digitally incrementing from its present to the final value, as determined by final value register 54 at the rate determined by rate register 44. The digital transitions at logic circuitry 64 output are monitored by the digital analog converter 74 producing a corresponding analog signal at the converter's output 84. This output is applied to the control input of a combiner circuit 94 which combines a 90 hertz tone, originating from block 104, and a 150 hertz tone, originating from a block 114, into a resultant output signal at its output 124. The combined signal is in turn fed via a line 125 to the second input 132 of the generator 130.

Operation of the VOR/marker tone circuit block 24 may be understood as follows. Upon its address register 36 receiving an appropriate address, a logic circuit 76, which contains the present value of the VOR signal in digital form, is caused to increment from the present value to the final value, a determined by register 56, at the rate determined by rate register 46. The instantaneous digital transitions corresponding to the desired VOR signal experienced by logic circuit 76 appear on its output bus 86 and are fed to the input of bearing switching circuitry 96 as will be better understood herein below with respect to FIG. 5. Bearing switching circuitry 96 activates selected switches in response to the signal on line 86 thereby producing at its output 126 a switching sequence which, when fed via a bus 127 to the third input 133 of generator 130 causes generator 130 to produce a desired VOR signal.

In addition to creating a desired VOR signal simulation, circuitry 24 is capable of creating any one of several beacon marker tones. Thus, if address 36 receives an address corresponding to a desired marker tone, logic circuit 76 processes a digital signal corresponding to that tone via a mode/tone register 140. This results in tone switching circuitry 142 to be activated. Fed into tone switching circuitry 42 are three distinct tones, originating from blocks 143-145, corresponding to the beacon tones to be used. The tone switching circuit, in response to the logic 76, feeds the selected one of the three tones 143-145 to an output line 146 which in turn feeds through bus 127 to the generator 130.

In this, the preferred embodiment of the invention, generator 130 is comprised of a commercially available NAV 401 L generator, available from Instrument Flight Research. As supplied, generator 130 is capable of generating any of the above discussed signals in response to mechanical switches on the generators front panel. Thus, for example, a series of thumbwheel switches are setable between 0° and 360° which, when set, result in the generation of a corresponding VOR signal. In addition, the generator 130 is supplied with potentiometers corresponding to the localizer and glideslope signals. At either ends of the potentiometers are fed the fixed level 90 and 150 hertz tones. Thus, the tap of the potentiometer contains a constant amplitude signal which is the sum of the two tones in any desired proportion depending upon the position of the tap with respect to the end points.

As will be discussed herein below, in this the preferred embodiment of the invention, the circuitry of the generator 130 is modified such that the computer 10 has complete control over all of the signals to be generated by generator 130. In addition, it should be noted that the 90 and 150 hertz tones as shown in blocks 102, 112, 104 and 114 are internally generated within generator 130 as are the beacon tones 143-145.

Thus, in response to signals at its inputs 131-133, the modified generator 130 produces at its antenna output 150 the desired set of simulated radio navigation signals which may then be radiated to test a given aircraft system.

Figure 2A:
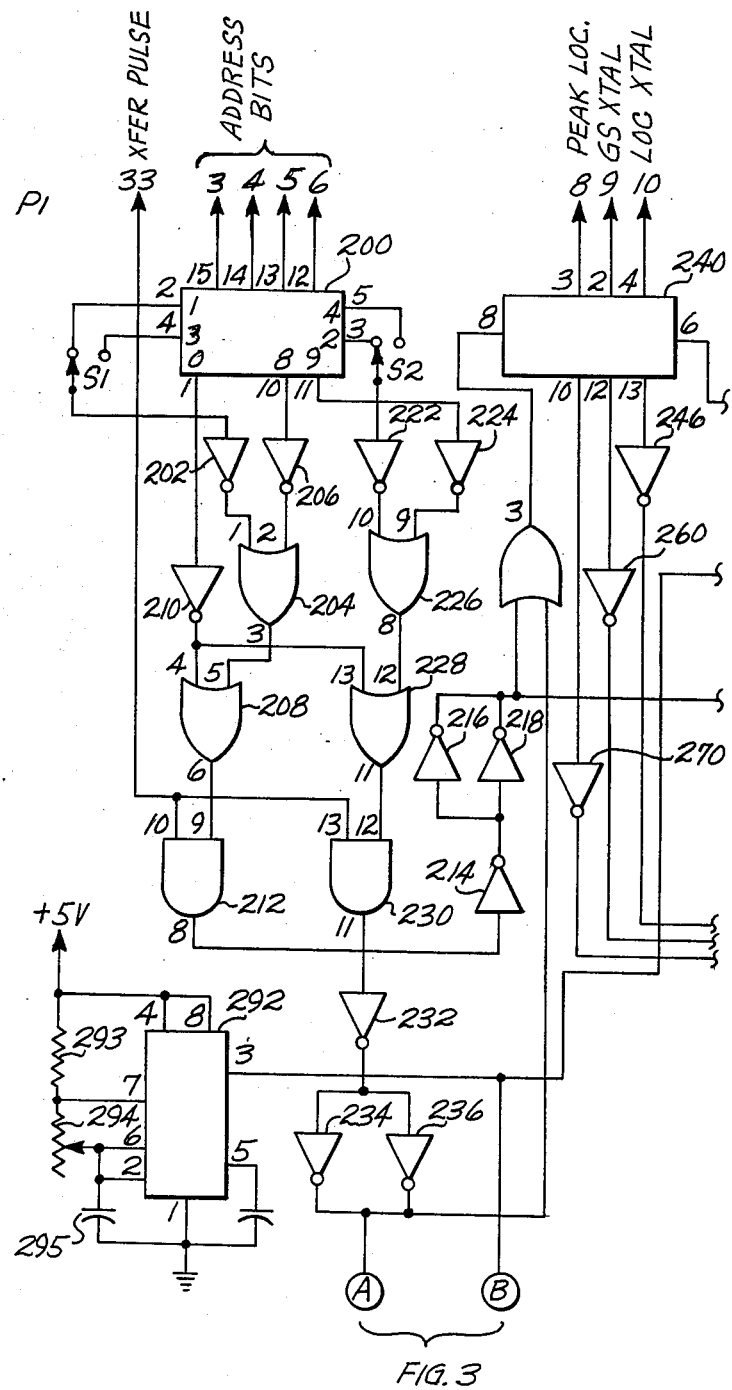
FIGS. 2A, B and C are detailed schematic diagrams of the localizer circuitry shown in FIG. 1.
Figure 2B:
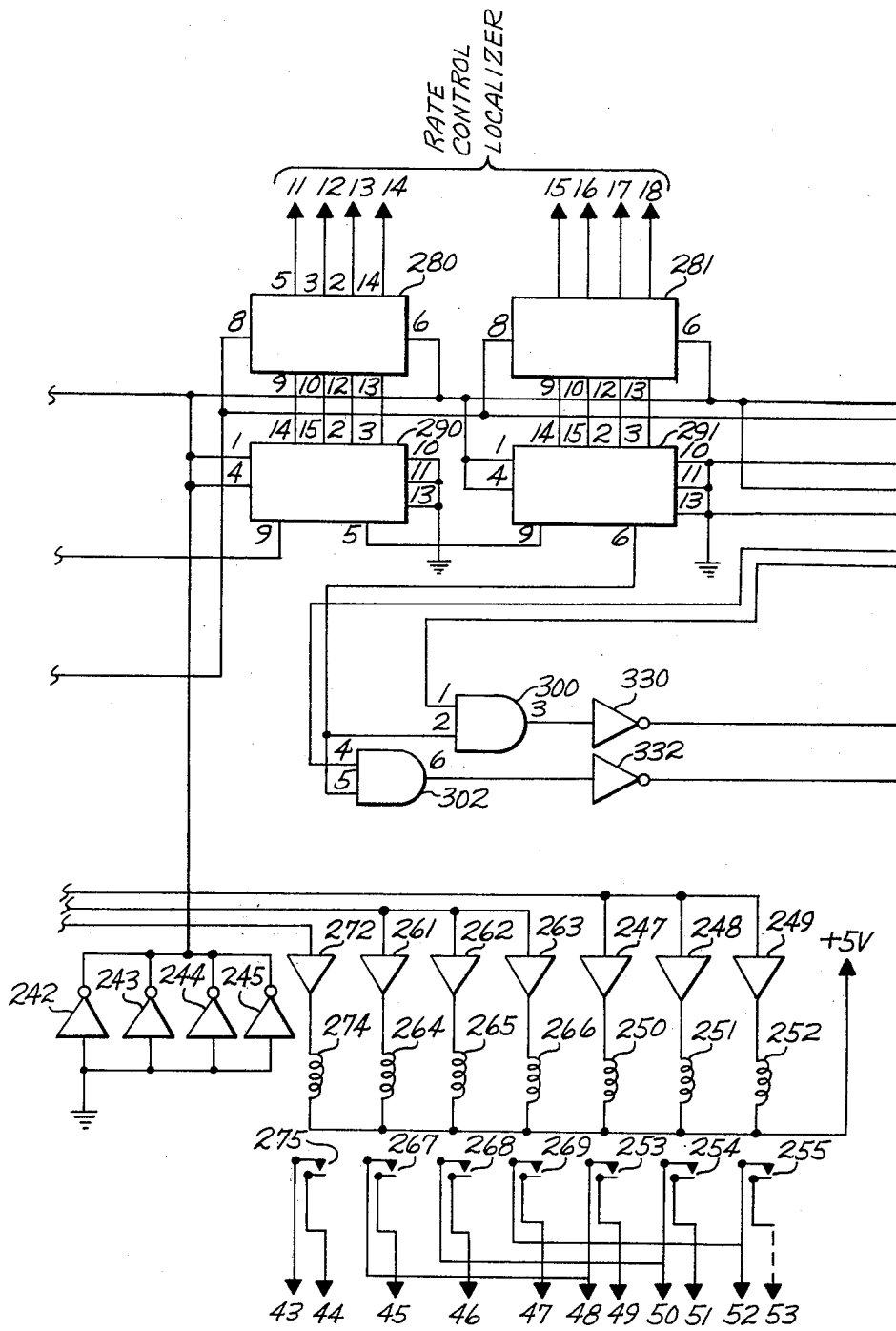
Figure 2C:
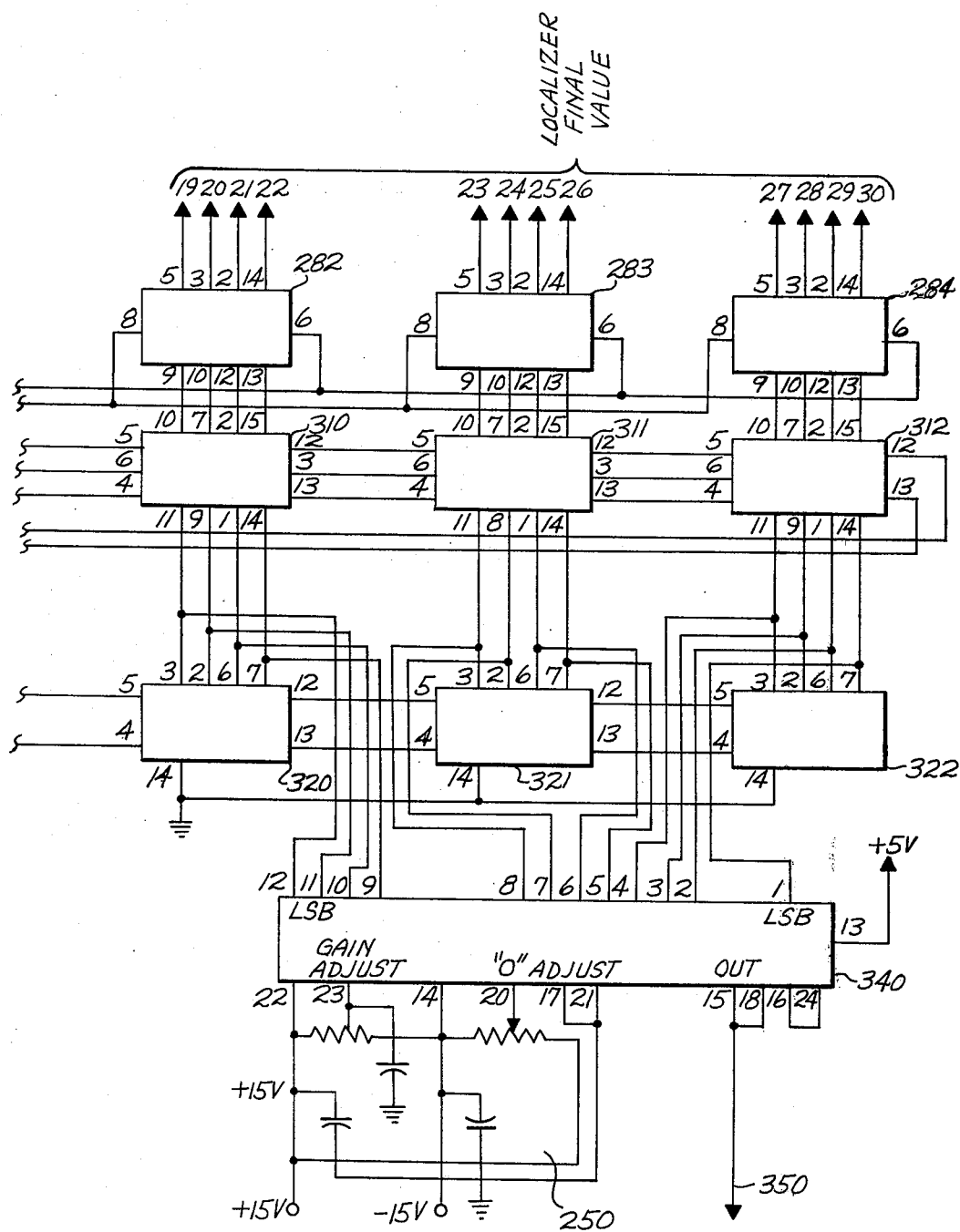

FIGS. 2A, B and C are detailed schematic diagrams of the localizer circuit 20 shown in FIG. 1. In this and subsequent drawings, arrows extending from a line indicate connections to external circuitry and not necessarily the direction of current flow. Here, the address bits, carried on lines 3-6 of the 40 line bus 16 of FIG. 1, are applied to pins 12-15 of an integrated circuit 200. Integrated circuit 200 is a one of ten decoder, commercially available as a TTL part 7442. A binary address on the input pins 12-15 is converted to its decimal equivalent in decoder 200 causing a corresponding decimal one of 10 output pins to be driven to a low state. In the instant embodiment, the address of the localizer is 0001, corresponding to the decimal number 1. Thus, upon receiving the proper address, pin 2 of decoder 200 is driven to its low state. This is coupled through switch 1 to inverter 202 which inverts the low to a high state at pin 1 of OR gate 204. The other input to OR gate 204 at pin 2 is low since the decimal 8 place, at pin 10 of decoder 200 is high and thereafter inverted by inverter 206 to a low state. Thus, the output at pin 3 of OR gate 204 is high being fed to one input at pin 5 of the OR gate 208. OR gates 204 and 208 are both provided in a type 7432 integrated circuit. The remaining input at pin 4 of OR gate 208 is low due to the inversion of inverter 210 at the pin 1 output from decoder 200. Thus, the output, at pin 6 of OR gate 208 is driven high and is coupled to pin 9 of AND gate 212. Coupled to the second input at pin 10 of AND gate 212 is a transfer pulse which appears on line 33 of the bus 16. The transfer pulse is generated by the computer approximately ten microseconds after data is presented on the bus line. This allows the data to settle before it is entered into circuitry in response to the transfer pulse. Thus, in response to a transfer pulse AND gate 212 produces a pulsed high at its output at pin 8. The pulsed high is inverted by inverter 214 to a low level and then inverted again by paralleled inverters 216 and 218 to a high level. The purpose of inverters 216 and 218 is to provide high drive fanout capability.

The pulsed high output from inverters 216, 218 is applied to one input at pin 1 of OR gate 220. The signal at the remaining input at pin 2 of OR gate 220 is at a low level as is understood as follows. The outputs at pins 3 and 11 of decoder 200 are high which invert to lows through inverters 222 and 224 at the inputs of pins 9 and 10 of OR gate 226. Thus, the outputs at pin 8 of OR gate 226 is low resulting in a low at the input of pin 12 of OR gate 228. This low, coupled with the low at its remaining input at pin 13, results in a low at its output at pin 11. OR gates 204, 208, 226 and 228 are all provided on a 7432 integrated circuit.

The low out of OR gate 228 is coupled to pin 12 of AND gate 230 which, along with the low level at its second input level at pin 13 results in a low level at its output at pin 11. This is subsequently inverted by an inverter 232 and fed via further parallel connected inverters 234 and 236 to an output point A.

Thus, with a pulsed high at its pin 1 input and a low at its pin 2 input, the output of pin 3 of OR gate 220 is pulsed high, which output is coupled to pin 8 of a storage register 240. Storage register 240, which is comprised of a type 74L95 integrated circuit, is operable in either a serial or parallel load mode. In this case, the parallel load mode is desired and thus pin 6 of the integrated circuit is biased high via a parallel array of inverters 242-245. Thus, data on lines 8, 9 and 10 from the 40 line bus 16 is transferred to output pins 10, 12 and 13, respectively of register 240 upon receipt of the transfer pulse at its pin 8. In the localizer only mode, line 10 of the 40 line bus 16 is high causing pin 13 of register 240 to be high. This, as inverted by inverter 246, activates three buffer stages 247-249 low resulting in current in relay coils 250-252 causing the closing of switch contact pairs 253-255, respectively. The closing of these switches results in suitable changes in the NAV-401L generator as coupled through output lines 48-53, described more fully herein below. As a result of the switch pairs 253-255 closing the localizer crystal controlled carrier frequency is generated within the NAV-401L generator.

Should line 9 of bus 16 be high, indicating the glideslope mode, pin 12 of register 240 would be driven high and, as inverted through inverter 260 would result in buffers 261-263 driving current through coils 264-266 and thus closing switch contacts 267-269. With the modifications to the NAV-401L receiver described herein below, the closing of switch contacts 267-269 through output pins 45-47 causes the generator to produce its crystal controlled glideslope carrier frequency.

Finally, should a high level appear at line 8 of the 40 line bus 16, at the same time as a high at line 9, pin 10 of register 240 is be driven high and thereafter inverted via inverter 270 to a low level causing buffer 272 to activate relay coil 274 resulting in the closing of switch contact 275. This, as connected through lines 43, 44 to the NAV-401L generator, results in both localizer and glideslope crystal controlled carrier signals to be generated.

The pulsed high out of inverters 216, 218 is further coupled to the number 8 pins of registers 280-284. The pin 6 of each of the registers 280-284 is driven high via inverters 242-245 thus causing each of these type 74L95 registers to operate in the parallel mode.

The inputs to registers 280 and 281 receive the localizer rate control bits appearing on lines 11-18 of bus 16. Upon receipt of a transfer pulse at its pin 8 inputs, each of the registers 280, 281 parallel loads the data bits at its inputs to the divisor inputs of a pair of type 7497 divider IC's 290, 291. Thus, loaded into the first divider 290 is a binary number corresponding to a first desired divisor $N_1$ and, correspondingly, loaded into the second divider 291 is a second divisor $N_2$.

Applied to the input at pin 9 of the first divider 290 is a 500 hertz waveform generated by a type 555 multivibrator IC 292. As is well known with this IC, external components 293, 294 and 295 are selected to produce a 500 hertz waveform at its output at pin 3.

Thus, the 500 hertz waveform appearing at the input at pin 9 of the first divider 290 is divided by the first divisor $N_1$ and outputted at its output at pin 5. This divided signal is in turn applied to the input of pin 9 of the second divider 291. Here, the signal is divided by the divisor $N_2$ and appears at the output pin 6 of the divider. Overall, therefore, the 500 hertz signal is divided by a divisor $N = N_1 \times N_2$.

The divided signal of frequency 500 hertz/N is applied to pin 2 of AND gate 300 and pin 5 of AND gate 302. AND gates 300, 302 along with AND gates 212, 230 are comprised of type 7408 integrated circuits. The remaining inputs at pins 1 and 4 of AND gates 300, 302 are determined by the outputs at pins 12 and 13 of a comparator chain comprised of comparator type 74L85 integrated circuits 310-312.

The comparators 310-312 are wired, as shown, to compare the number loaded into registers 282-284 to the present count of the binary counters 320-322. The numbers appearing in the registers 282-284 are the desired final value of the localizer signal as appearing on lines 19-30 of the 40 line bus 16. The numbers contained within counters 320-322 correspond to the present value of the localizer signal.

Thus, if the computer is programmed to change the localizer signal, it loads the desired final value into the registers 282-284. The comparators 310-312 compare the desired new value to the present value as determined by counters 320-322 and, should the desired value exceed the present value the output at pin 13 of comparator 312 is raised to a high level whereas, if the desired new value is less than the present value, the output of pin 12 of comparator 312 is activated to a high state.

If the new desired final value is higher than the present value AND gate transmits the 500 hertz/N signal through an inverter 330 to the count up input at pin 5 of counter 320. Counter 320, thus, increments up with the carry appearing at its output pin 12 being routed to the carry input of counter 321. Correspondingly, the carry output of counter 321 is loaded to the carry input of counter 322. In this manner, the counters 320-322 will count up at the rate determined by the divisor N to the value called for by the computer.

Should the desired final value called for by the computer be less than the present value in counters 320-322 then AND gate 302 routes the 500 hertz/N signal through an inverter 332 to the count down input of counter 320. The borrow of counter 320 is routed to the count down of counter 321 and, similarly, its borrow output at pin 13 is routed to the count down at pin 4 of counter 322. Thus, the counters in this mode decrement to the desired final value.

The instantaneous value of the digitized localizer signal is constantly monitored at the inputs, pins 1-12, of a digital to analog converter 340. In this, the preferred embodiment of the invention, digital to analog converter 340 is comprised of a Burr Brown type DAC80 CBI-V module. As described in application notes to this module, various external components, indicated generally at 250 are employed to gain and "0" adjust the analog signal appearing at the units output pins of 15 and 18. Thus, the output line 350 carries an analog signal whose value is directly proportional to the instantaneous digitized localizer signal present in the counters 320-322. This analog value is fed to a combiner circuit, described in detail with respect to FIG. 4.

If the computer wishes to address the glideslope circuitry it produces a suitable address of 0010 on lines 3-6 of the 40 line bus 16. Now, pin 3 of decoder 200 is activated and, in a manner similar to that described hereinabove with respect to the localizer address on pin 2 being activated, a pulsed high appears at point A. It should also be noted that the 500 hertz timing signal is coupled to the glideslope circuitry described in FIG. 3 via point B.

The arrangement of the address logic provides substantial flexibility to the overall system. For example, the system may be extended to include a NAV-401L which is dedicated to the generation of VOR and marker beacon signals, and two NAV-401L's which are dedicated to the generation of ILS signals (localizer, glideslope). A NAV-401L, identified as localizer 1/glideslope 1, generates signals on a unique frequency, while the other NAV-401L identified as localizer 2/glideslope 2, generates signals on a different frequency. This arrangement allows testing of the aircraft where divergent signal stimulation is called for, or allows for selection of a backup unit in the event of generator failure, or interference on the selected frequency.

The addressing format for localizer/glideslope is as follows:

|  | DECIMAL ADDRESS | INPUT PINS (BUS 16) | | | |
| --- | --- | --- | --- | --- | --- |
|  |  | 3 | 4 | 5 | 6 |
| Localizer 1 | 1 | 1 | 0 | 0 | 0 |
| Glideslope 1 | 2 | 0 | 1 | 0 | 0 |
| Localizer 2 | 3 | 1 | 1 | 0 | 0 |

-continued

| | DECIMAL ADDRESS | INPUT PINS (BUS 16) | | | |
|---|---|---|---|---|---|
| | | 3 | 4 | 5 | 6 |
| Glideslope 2 | 4 | 0 | 0 | 1 | 0 |
| Localizer 1 & 2 (simul.) | 8 | 0 | 0 | 0 | 1 |
| Glideslope 1 & 2 (simul.) | 9 | 1 | 0 | 0 | 1 |
| All Loc. & Gs. (simul.) | 0 | 0 | 0 | 0 | 0 |

Switch S1 allows the localizer address to be changed from decimal 1 to decimal 3. Switch S2 functions in the same manner for the glideslope address, the addresses being decimal 2 and decimal 4.

This allows a universal printed circuit (PC) board to be constructed, which can then be switch configured for its application in the system.

Since pin 10 of IC 200 is hardwired to pin 5 of IC 206, and pin 10 of IC 200 corresponds to a decimal 8, it can be seen that an address corresponding to decimal 8 on the bus 16 will cause the PC board assigned to localizer 1 and the PC board assigned to localizer 2 to respond simultaneously, thus allowing control of two signal generators at the same time. The receipt of a decimal 8 by IC 200 causes pin 10 of IC 200 to go low. This low being then input to pin 5 of IC 206 causes a high to be input on pin 2 of the OR gate IC 204. From this point everything functions identically to the previous discussion, except it happens on 2 PC boards simultaneously.

The above discussion is true for the glideslope portion of the address except that the address on input bus 16 is a decimal 9 and IC 200 outputs a low on pin 11, causing a high from inverter 224 to be sent to pin 9 of OR gate 226. The rest of the glideslope address functions the same as previously discussed, except that it happens on two PC boards simultaneously.

In the "all call" address mode, a decimal 0 (zero) is input to lines 3-6 of bus 16. This results in a low being output on pin 1 of IC 200 on two PC boards. The low is inverted to a high by IC 210 and input to pin 4 of IC 208 and pin 13 of IC 228 causing localizer and glideslope to be simultaneously addressed on both PC boards. In this manner, localizer no. 1 and no. 2, plus glideslope no. 1 and no. 2 are simultaneously controlled by a common rate and magnitude command.

Figure 3:
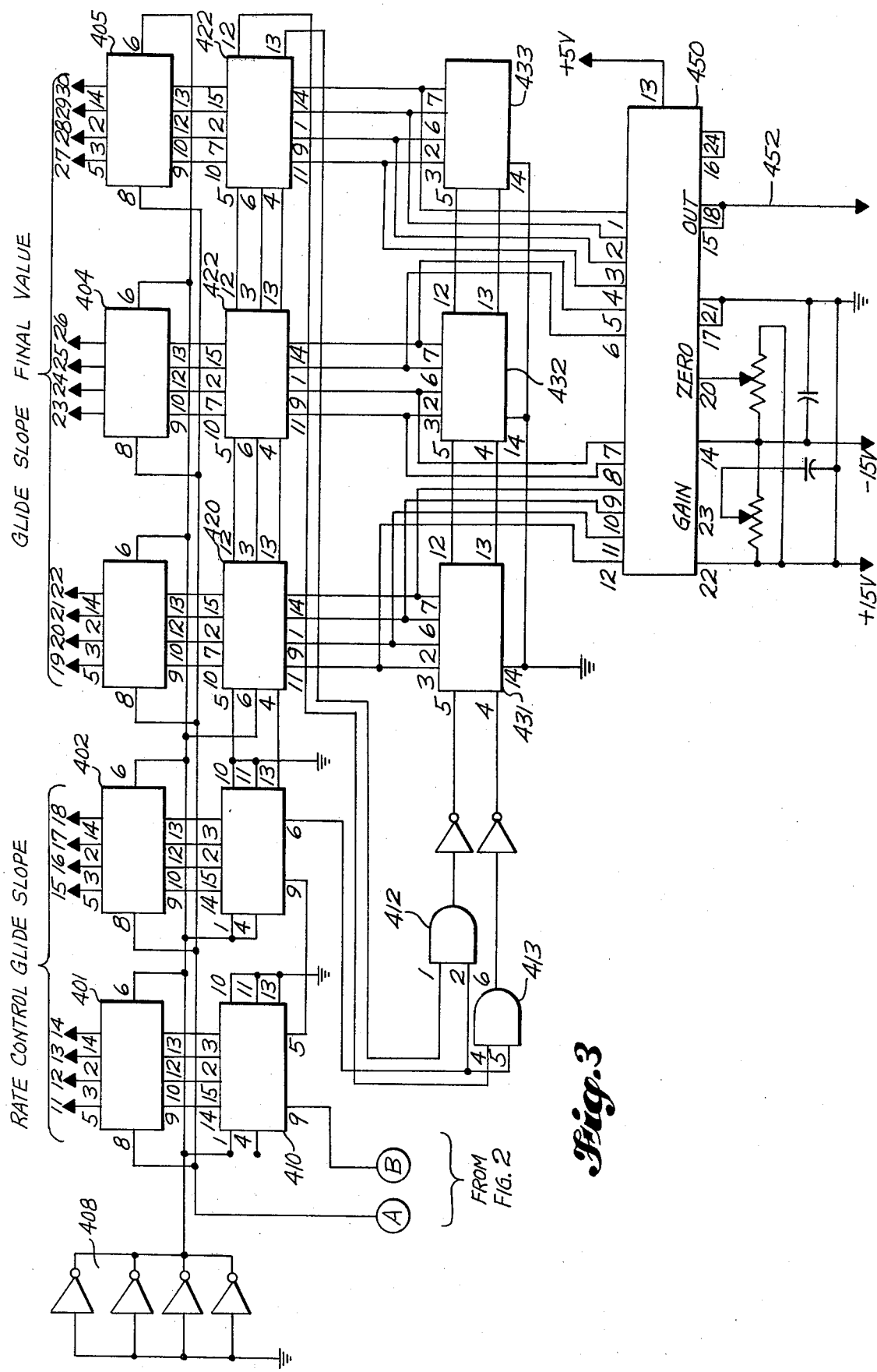
FIG. 3 is a detailed schematic diagram of the glideslope circuitry shown in FIG. 1.

FIG. 3 is a detailed schematic diagram of the glideslope circuitry 22 of FIG. 1. Here, as with the localizer circuitry of FIG. 2, a transfer pulse at point A is coupled to pin number 8 of a series of type 74L95 registers 401-405. The registers are biased to their parallel load mode via a high level, as created by the inverter bank 408, being coupled to pin 6 of each of the registers 401-405.

As before, the desired rate, appearing on lines 11-18 of the 40 line bus 16, are loaded into dividers 410, 411 causing the 500 hertz signal appearing at point B to be suitably divided by a net divisor N at the output pin 6 of divider 411. This divided signal is applied to the inputs of AND gates 412 and 413.

The remaining inputs to AND gates 412 and 413 are controlled by the outputs from a comparator chain comprised of three comparators 420-422. The comparators 420-422 compare the desired glideslope final value, as loaded through registers 403 and 405 on the 40 line bus 16 lines 19-30, to the present glideslope digitized value as contained within counters 431-433.

In a manner identical with the localizer circuit described with respect to FIG. 2, if the desired final glideslope value as determined by the computer is greater than the present value in counters 431-433 AND gate 412 is activated and the counters 431-433 sequentially increment up to the desired value. If, however, the desired final value is less than the present value, AND gate 413 is activated causing the counters 431 to 433 to decrement to the desired value. The rate at which the final values are approached is determined by the loaded divisors in dividers 410, 411.

Also as with the localizer circuitry, the instantaneous digitized glideslope value is monitored via a digital to analog converter 450 which produces a corresponding analog output signal on its output line 452.

Figure 4:
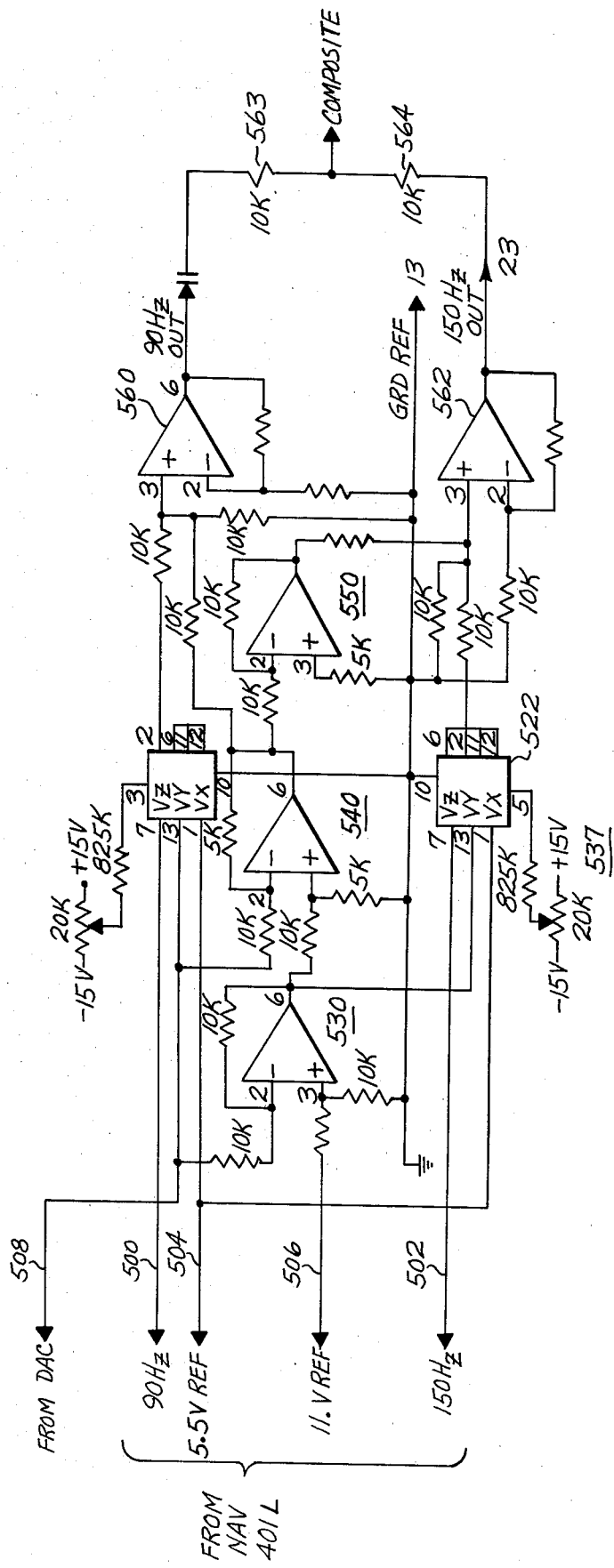
FIG. 4 is a detailed schematic diagram of the combiner circuitry shown in FIG. 1.

FIG. 4 is a detailed schematic diagram of the combiner circuits 92, 94 shown in FIG. 1. The design of the combiner circuit whether used in the localizer, as with combiner 92 or glideslope, combiner 94 of FIG. 1, is the same. Thus, the design of a single combiner is shown.

Several of the inputs to the combiner are taken from within the NAV-401L generator. Thus, lines 500 and 502 receive the constant level 90 hertz and 150 hertz tones from the generator. The amplitudes of each of the tones is at the same fixed level. Also received from the generator is a 5.5 volt reference on line 504 and an 11 volt reference on line 506. The analog output signal from either the converter 340 on line 350 of the localizer circuit shown in FIG. 2 or the converter 450 on the output line 452 of the circuit shown in FIG. 3 is fed to the combiner via a line 508.

The fixed level 90 hertz and 150 hertz tones are fed, respectively, to the $V_z$ inputs, at pin 7 of a pair of divider modules 520, 522 respectively. The analog signal on line 508 is fed directly to the $V_y$ input, pin 13, of divider module 520 whereas a differential amplifier stage indicated generally at reference 530 subtracts the analog signal appearing on line 508 from the 11 volt reference on 506, applying the resultant to the $V_y$ input, at pin 13, of divider module 522. The 5.5 volt reference on line 504 is fed directly to the $V_x$ inputs, at pin 1, of each of the two divider modules 520, 522. Also shown are offset circuits 536, 537 which are fed to pin 5 of each of the modules 520, 522.

The divider modules 520, 522 in this, the preferred embodiment of the invention, are Burr Brown type 4302 dividers, which are readily commercially available.

In the known manner, the dividers 520, 522 produce an output signal, at pin 6, according to the following equation;

$$E_{out} = V_y(V_z/V_x).$$

Thus, the signal at pin 2 of divider module 420 is proportional to the analog signal on line 508 times the 90 hertz signal on line 500 whereas the output at pin 2 of divider module 522 is proportional to 11 volts minus the analog level on line 508 times the 150 hertz signal level.

These signals are summed with DC error correction signals produced by differential amplifiers 540 and 550 into summing amplifiers 560, 562. The function of the differential amplifiers 540, 550 is to restore the 5.5 volt DC reference level present in the NAV-401L receiver to the output of the combiner circuit. It should be noted that each of the amplifiers utilized in the circuits of 530, 540, 550, 560 and 562 are commercially available LM 308 integrated circuits.

Thus, the output from summing amplifier 560 is proportional to the 90 hertz reference level input times the control signal from the digital to analog converter whereas the output from amplifier 562 is proportional to the fixed 150 hertz reference times 11 volts minus the digital to analog converter output signal. These two signals are summed in summing resistors 563 and 564 producing an output composite signal which is of constant amplitude and has controlled proportions of the 90 hertz and 150 hertz signals in response to the output from the digital to analog converter. This composite signal is, thus, seen to be the information signal of either the localizer or glideslope which is then routed to the NAV-401L generator where it modulates the appropriate carrier.

Figure 5A:
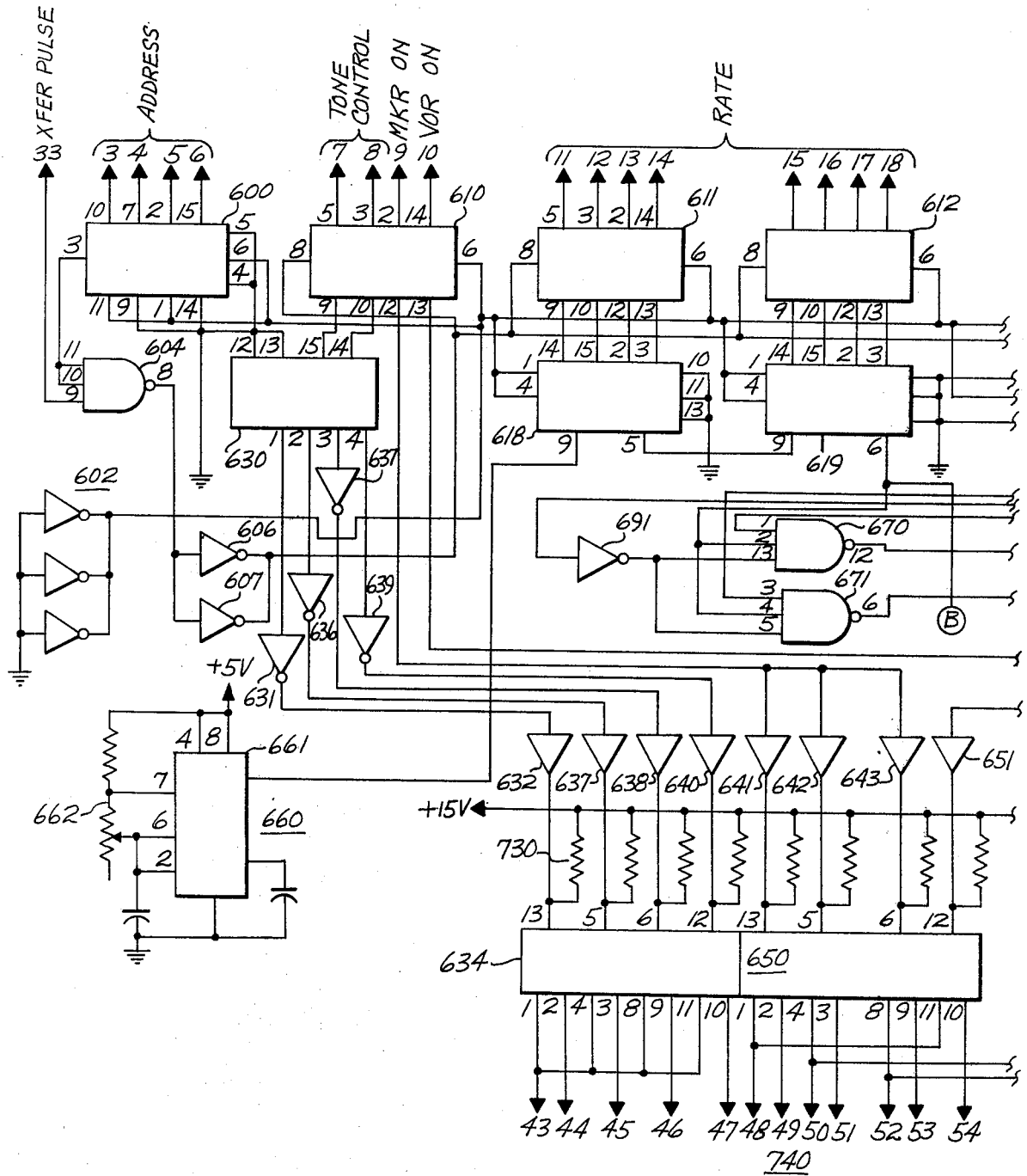
FIGS. 5A and B are detailed schematic diagrams of the VOR circuitry shown in FIG. 1.
Figure 5B:
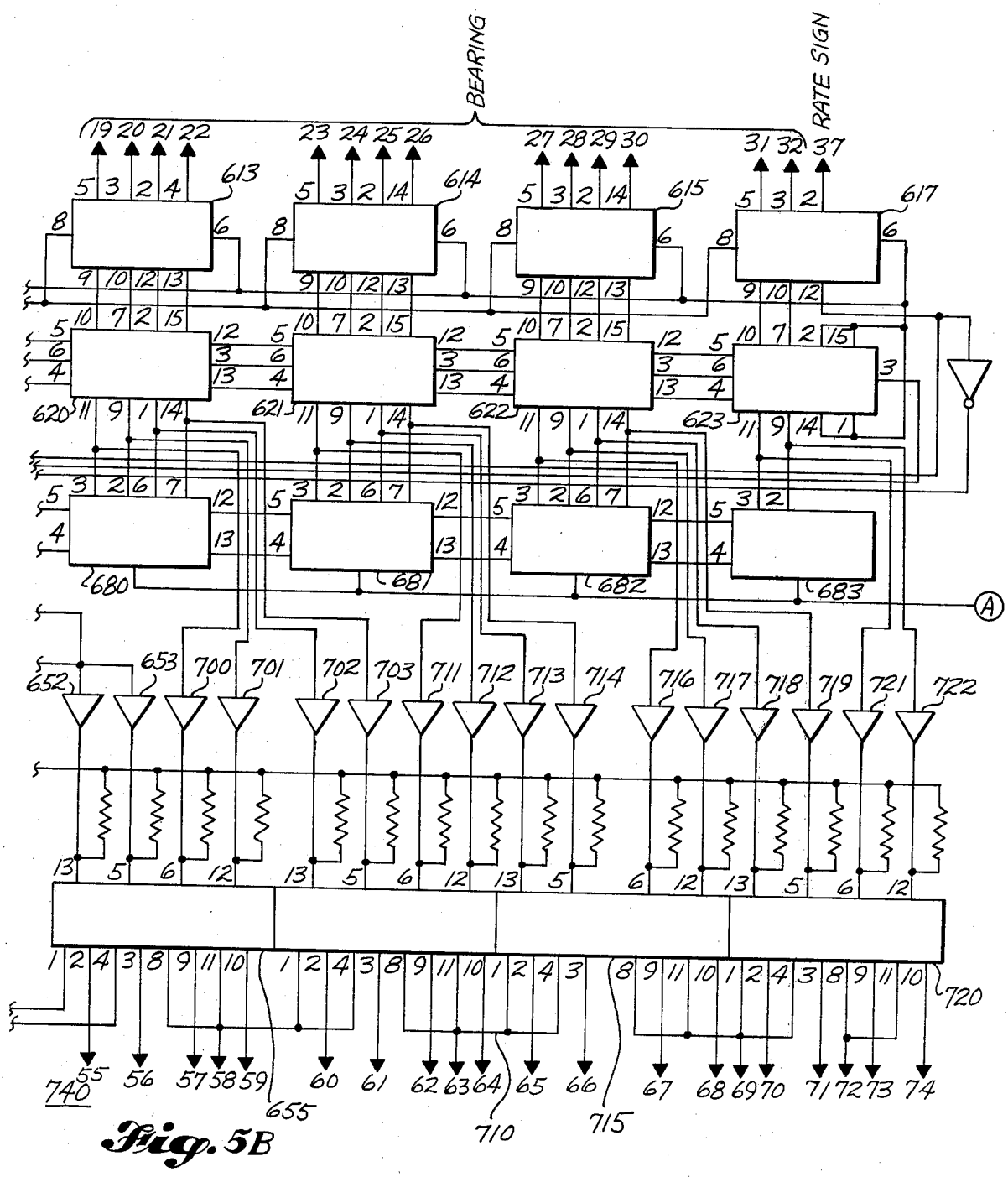

FIGS. 5A and B are detailed schematic diagrams of the VOR/marker tone circuit 24 shown in FIG. 1.

Here, as with the localizer and glideslope circuits, an address is received on lines 3–6 of the 40 line bus 16. The address is coupled into the inputs of a type 74L85 comparator 600. The comparator is wired such that when the signal at its input pins 10, 7, 2 and 15 is equal to the signal present at its input pins 11, 9, 1 and 14 equality is detected and pin 3 goes high. As shown, pins 11 and 14 connect to a high level as determined by the inverter bank 602. Pins 9 and 14, as shown, are grounded. Thus, the reference address is 1010. With a 1010 appearing at the address input, a quality is detected and pins 10 and 11 of NAND gate 604 go high. Upon subsequent occurrence of a transfer pulse on line 33, pin 9 of NAND gate 604 goes high thus producing a low level pulse at pin 8. This low level pulse is inverted by parallel inverters 606 and 607, which are used to increase fanout, and are coupled to pin 8 of each of 7 type 74L95 registers 610–617.

Pins 7 and 8 of the 40 line bus 16 determine which of four possible tones are generated, with pin 9 determining whether or not a marker beacon is on and pin 10 determining whether or not the VOR is on.

When lines 7 and 8 are low, this results in low levels at pins 9 and 10 of register 610. These low levels are in turn routed to pins 15 and 14 of a one-of-ten decoder 630. Pin one of decoder 630 assumes a low level in response to low levels at pins 15 and 14, this low level being inverted by inverter 631 and buffered through driver 632 before being applied to pin 13 of switching IC 634.

If line 7 of bus 16 assumes a high level with line 8 remaining low, this results in pin 15 of decoder 630 being high and pin 14 of decoder being low. With those inputs, pin 2 of decoder 30 goes low, which low level is inverted by inverter circuit 636 and buffered through driver circuit 637 before being applied to pin 5 of switching IC 634.

If line 7 of bus 16 is low while line 8 of the bus is high, this results in pin 9 of register 610 being low whereas pin 10 is high. With these inputs, pin 3 of decoder 630 goes low, which low level is inverted by inverter 637 thereby producing a high level which is buffered through driver 638 before being applied to pin 6 of switching circuit 634.

The final condition is for high levels at both lines 7 and 8 of bus 16. Under this condition, pins 9 and 10 of register 610 go high resulting in pin 4 of decoder 630 being driven low. This is inverted by an inverter 639 and buffered by a buffer 640 thereby driving pin 12 of switching circuit 634.

These four conditions on line 7 and 8 of bus 16 determine which of four tones is generated. In a manner described more fully herein below, the switching circuit 634 is wired into the NAV-401L generator such that when switching pin 13 is driven a one kilohertz tone is generated, with a 400 hertz, 1300 hertz and 3 kilohertz tone being generated in response to pins 5, 6 and 12, respectively, being driven.

Line 9 of the bus 16 determines whether or not a marker tone should be turned on. With line 9 high, pin 12 of register 610 is high which, due to the buffers 641–643, drives pins 13, 5 and 6 of switching circuit 650. As described more fully herein below, switching circuit 640 is wired to the generator such that upon pins 13, 5 and 6 being driven the marker tone is turned on.

Line 10 of the bus 16 determines whether or not the VOR circuitry within the generator is to be activated. When line 10 goes high, pin 13 of register 610 is driven high which, via buffers 651–653, drives pin 12 of switching circuit 650 and pins 13 and 5 of switching circuit 655.

The circuitry which determines the rate at which a desired final value VOR bearing is approached is virtually identical to that discussed with respect to the localizer and glideslope circuit. In particular, a 500 hertz generator, indicated generally at 660 is comprised of a type 555 integrated circuit 661 and associated timing circuitry, indicated generally at 662 which determine the frequency of oscillation. Produced at pin 3 of 555 integrated circuit 661 is the 500 hertz signal. This signal is passed to the input, at pin 9, of the divider 618. Loaded into the divider 618 is a first divisor $N_1$ from register 611.

Thus, the 500 hertz signal is divided in frequency by a factor $N_1$ and passed, via output pin 5 to the input, at pin 9, of the second divider 619. Contained within the second divider 619 is a second divisor $N_2$ which has been loaded via register 612. The divisors in the registers 611, 612 are sourced via lines 11–18 of the 40 line bus 16.

Thus, the signal out of the second divider 619, at pin 6, is the 500 hertz signal divided by a factor N, where $N = N_1 \times N_2$. This divided signal is passed to pins 2 and 4 of a pair of NAND gates 670, 671.

Lines 19 through 32 of the 40 line bus 16 determine the final VOR bearing. These are loaded into registers 613–617 and, upon the addressing circuitry determining that the VOR is being addressed, are compared via a sequence of comparators 620–623 to the present VOR bearing value as stored in a sequence of BCD counters 680–683. The BCD counters in this, the preferred embodiment of the invention, are comprised of type 74LS192, commercially available integrated circuits.

Line 37 of the 40 line bus 16 is a computer input indicating whether the final VOR bearing value should be approached from the clockwise or counter clockwise direction. Thus, if line 37 is low, pin 12 of register 617 goes low causing a low to appear at pin 3 of NAND gate 671 and a high, through inverter 690, to appear at pin 1 of NAND gate 670.

The comparator chain 620–623 is wired to produce a high at pin 3 of final comparator 623 only for the condition wherein the desired final values, as stored in registers 613–617, exactly equals the present value in counters 680–683. The status at pin 3 of comparator 623 is monitored at pin 13 of NAND gate 670 and at pin 5 of NAND gate 671.

Operation of the VOR bearing circuitry may be understood as follows. A desired new bearing setting, as determined by the computer, is loaded into the register 613–617. The computer also drives line 37 of bus 16 either high or low to determine whether or not the new bearing value should be approached from the clockwise or counter clockwise rotation. If the desired final value differs from the present VOR value, pin 3 of comparator 623 is low and, if the clockwise direction of approaching the final value bearing is desired, then pin 2 of NAND gate 670 is low resulting in a high at its pin 12 which causes the counter 680-683 to begin counting up at the rate 500 hertz/N.

Correspondingly, if the final value is to be approached in the counter clockwise sense, pin 3 of NAND gate 671 is low causing pin 4 of the first counter 680 to be driven resulting in a countdown of the counters. The countup or countdown of the counters 680-683 continues until such time that the present value in the counters exactly equals the desired final value stored in the registers 613-617 at which point pin 3 of comparator 623 is driven high and, as inverted through inverter 691 to the NAND gate 670, 671, eliminates a countup or countdown signal to the counters 680-683.

Figures 8, 9:
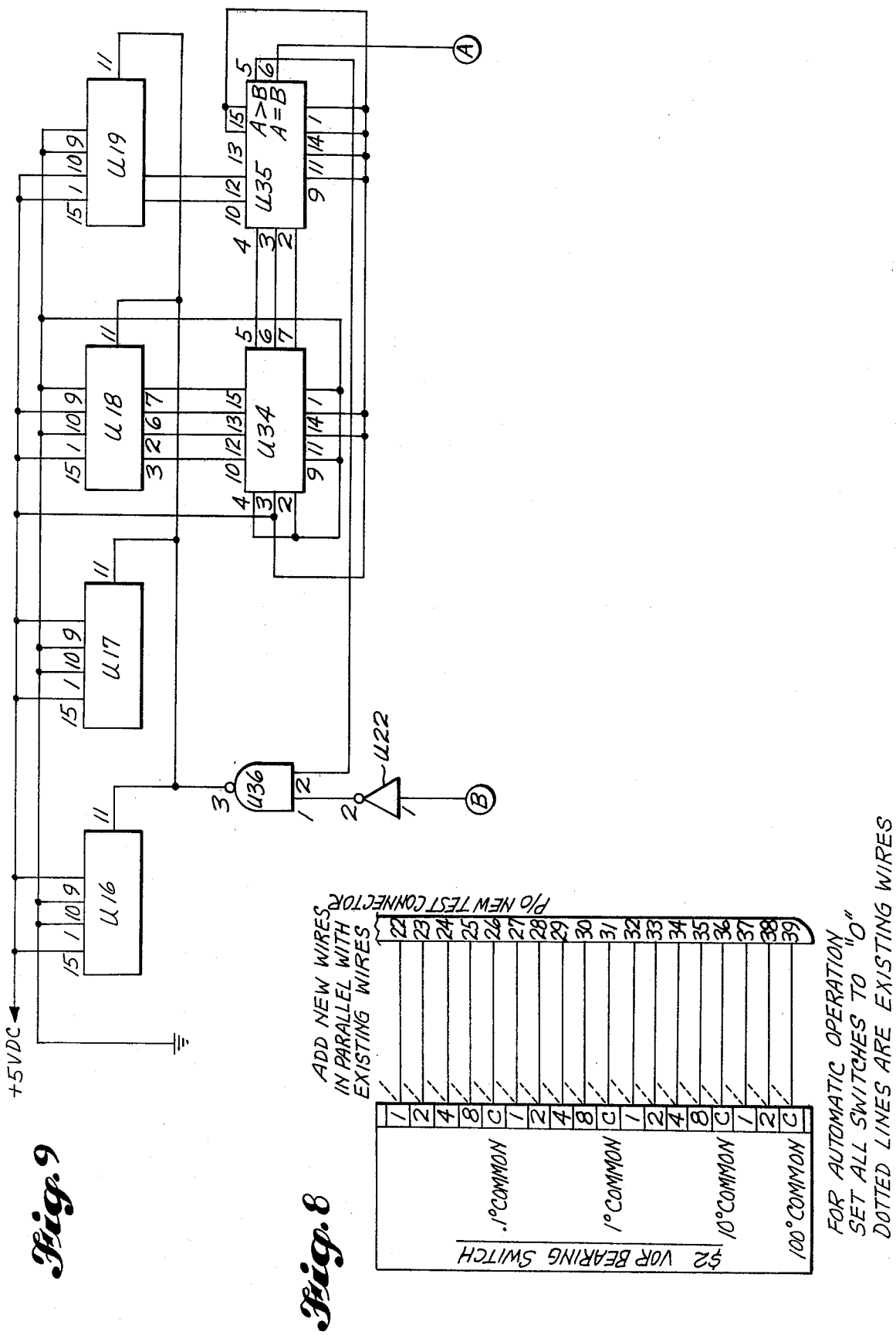
FIG. 8 is a schematic diagram illustrating the modifications to a NAV-401L generator allowing automatic generation of VOR bearings.
FIG. 9 is a schematic diagram illustrating a modification to the circuit of FIG. 5.

FIG. 9 shows modifications added to FIGS. 5A, B to confine the counting range to 0°-360°. As is known with the 74LS192 decade counter, configuring as per FIGS. 5A, B allows a count up/count down range of 0°-400°.

U34 and U35 are 7485 comparators added across the output of U18 and U19. The 'B' side of the comparator is hardwired for an input of 360°. Pin 6 of U35, which is the A=B output, is wired thru point 'A' to FIGS. 5A, B, whereupon it then connects to all 74LS192 counters pin 14, which is the clear line. In this manner, a count of 360.0° causes a high to be output on pin 6 of U35 which forces all counters to be 0° (zero). This event (clearing) is configured to occur on count-up or clockwise (cw) direction. When counting down or counterclockwise (ccw) thru 0° (zero), a borrow occurs causing the registers U16–U19 to output 359.9°. When this occurs, pin 5 of U35, which is the A B output, goes high. This high is passed to pin 2 out U36 a NAND 7400. On the next half cycle of the clock, pin 2 of U22 is high and a low is output on pin 3 of U36 to all counters pin 11, which is the load parallel of the counters. Pins 15, 1, 10 and 9 of the counters are wired to be equal to 359.9 degrees. When the load pulse occurs at pin 11, the counters are forced to the value 359.9 degrees and continue down counting (ccw rotation) to the target value in the manner previously described.

The instantaneous VOR bearing value, as determined in counters 680-683, is constantly sensed and used to drive corresponding circuitry in the NAV-401L generator. Thus, the present status of the counter 680 is buffered via buffers 700-703 and drives inputs 6 and 12 of switching circuit 655 and 13 and 5 of switching circuit 710. The present status of counter 681 is buffered through buffers 711-714 and applied to pin 6 and 12 of switching circuit 712 and 13 and 5 of switching circuit 715. The present value in counter 682 is buffered through buffers 716-719 and used to drive pins 6 and 12 of switching circuit 715 and pins 13 and 5 of switching circuit 720. Finally, the instantaneous values in counter 683 are buffered via buffers 721 and 722 and are used to drive pins 6 and 12 of switching circuit 720.

The switching circuits 634, 650, 655, 710, 715 and 720 are comprised of commercially available type CD 4016AE devices. These devices require a bank of pullup resistors, one of which is indicated by reference 730, each of which couples an input pin to the 15 volt supply.

Contained within the switching circuits are metal oxide devices which are activated via the input pins to essentially close a switch. The switch outputs couple through output pins, as shown, and connect through terminals, numbered 43-74 of an output plug, indicated generally at 740. This plug in turn couples to a connector, described more fully with respect to FIGS. 6, 7 and 8, on a modified NAV-401L generator.

Figure 6:
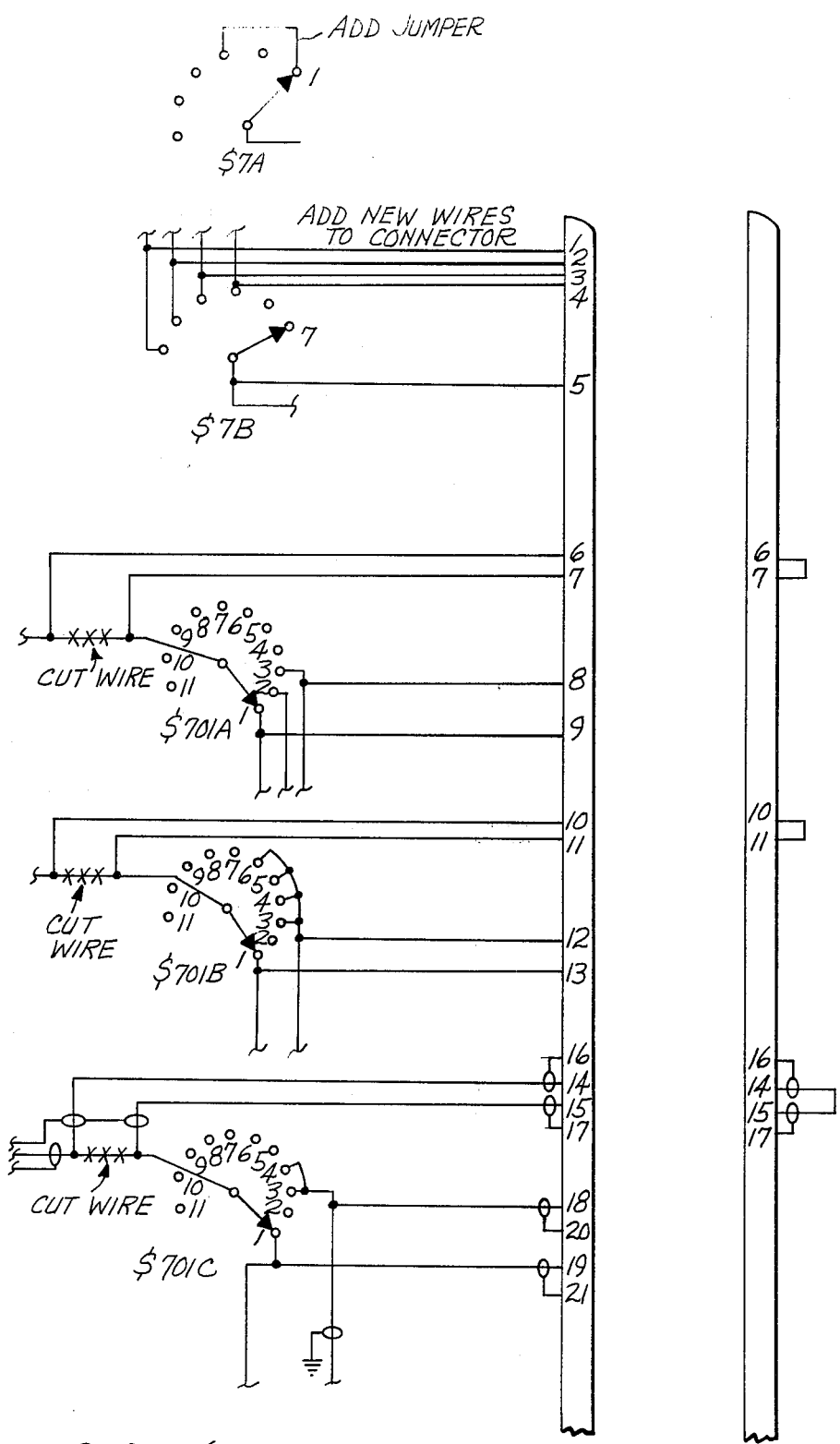
FIG. 6 is a schematic diagram illustrating the modifications to a conventional NAV-401L generator allowing automatic control of VOR and marker beacons.
Figure 7:
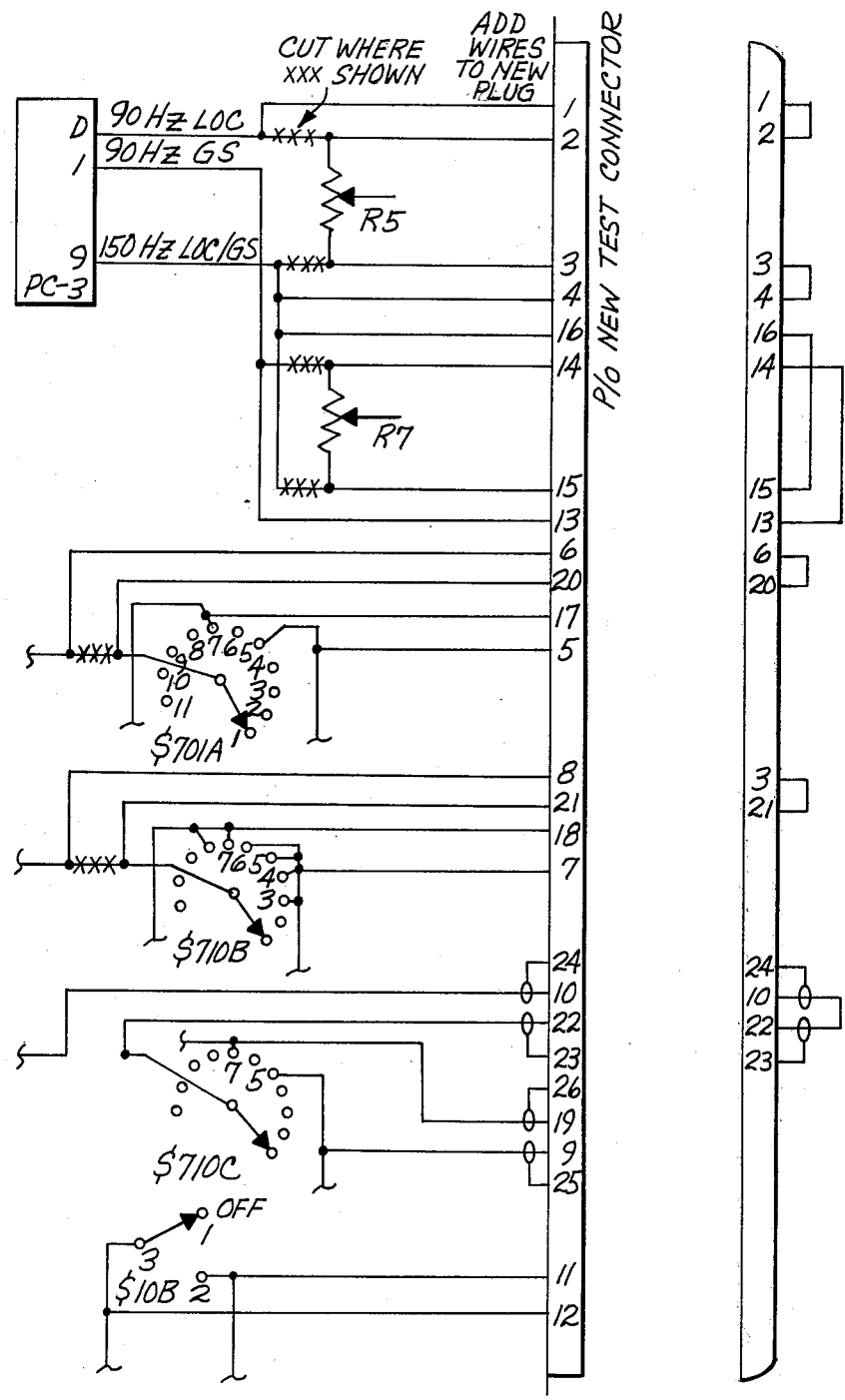
FIG. 7 is a schematic diagram illustrating the modifications to a NAV 401L generator allowing automatic generation of localizer and glideslope signals.

FIGS. 6, 7 and 8 detail modifications to a standard NAV-401L generator. In FIG. 6, modifications are shown to a NAV-401L to automate VOR and marker beacon generation.

A new connector is added to the NAV-401L to interface it and the control PC boards. Switch S7 which controls the audio tones for VOR and marker beacon, is left in the off position for automatic operation. Four wires have been added between the switch and the interface connector, allowing control of the tones via bus 127 on FIG. 1. Switch S701 is a three segment switch which routes signals, internal to the generator, to the proper NAV-401L circuits to place the generator in the marker beacon, VOR, localizer, glideslope or VHF communication generation mode. The input to the rotary portion of the switch segments has been cut and brought to the interface connector. Also, only the portions of the switch segments controlling marker beacon crystal and VOR crystal modes of operation have been brought to the interface bus connector. This creates a generator which can be controlled automatically to output all VOR and marker beacon signals, but not any other modes.

FIG. 8 shows the thumbwheel switches on the NAV-401L which are normally used in manual operation to select the desired bearing output using a BCD format. Duplicate wires are brought out to the automatic interface. In the automatic mode of operation, the switches are all set to 0 (zero) or "open" position and closure is then performed via the CMOS switches 655, 710, 715, 720 shown in FIGS. 5A, B.

FIG. 7 shows modifications to a NAV-401L to allow automatic control of localizer and glideslope. The 90 Hz and 150 Hz tones are removed from the manual control potentionmeters R5 (localizer) and R7 (glideslope) and routed to the interface connector. From there, they are input via lines 123 and 125 on FIG. 1 to the combiner printed circuit board. After being processed as previously described, they are routed back to the potentiometers in the NAV-401L. This allows the potentiometers to be used to null out tolerance errors in the aircraft receivers.

Switch S701 is modified as described in the VOR/marker beacon explanation, except that the control is now of the localizer crystal mode and glideslope crystal mode.

Both the VOR/MKR and LOC/GS configured NAV-401L generators are supplied with a jumper plug, shown in FIGS. 6 and 7, which when plugged into the interface connectors, serve to defeat the internal modifications. This allows removal of a generator from the automatic test equipment bay for normal use in the manual mode for all functions of the generator.

In summary, a means for automatically simulating aviation navigation signals has been disclosed.

While a preferred embodiment of the invention has been described in detail, it should be recognized that many variations and modifications thereto are possible, all of which fall within the true spirit and scope of the invention.

We claim:

1. Apparatus for automatically simulating the glideslope, localizer and very high frequency, omnidirection (VOR) guidance signals received by an aircraft comprising
control means for producing digital signals representative of:
(a) a desired final glideslope value and the rate which said final glideslope value should be approached,
(b) a desired final localizer value and the rate at which said final localizer value should be approached,
(c) a desired final VOR value and the rate at which said final VOR value should be approached;
glideslope circuitry means including means to receive the digital signals representative of the final glideslope value and the rate at which said final glideslope value should be approached and means responsive to said received signals to generate said desired final value at said desired rate;
localizer circuitry means including means to receive the digital signals representative of the final localizer value and the rate at which said final localizer value should be approached and means responsive to said received signals to generate said desired final value at said desired arate; and
VOR circuitry means including means to receive the digital signals representative of the final VOR value and the rate at said final VOR value should be approached and means responsive to said received signals to generate said desired final value at said desired rate.

2. The apparatus of claim 1 wherein the control means is connected to the glideslope circuitry means, localizer circuitry means and VOR circuitry means on a common bus and wherein each of said glideslope, localizer and VOR circuitry is assigned a unique digital address, which address is known by the control means, such that a selected one of the glideslope, localizer and VOR circuitry means responds to data on the bus in accordance with its address being present therewith.

3. The apparatus of either of claims 1 or 2 wherein said glideslope signal is comprised of the combination of a first signal $f_1$ of a first frequency and a second signal $f_2$ of a second frequency, with the sum of the amplitudes of said signals being a constant level, K, said glideslope circuitry means comprising:
final value register means for receiving and retaining said glideslope final value signal;
rate register means for receiving and retaining said glideslope rate of approach signal;
logic means for retaining the present value of said glideslope signal and digitally incrementing, at the rate determined by said rate register retained signal, to said final value as stored in said final value register;
digital to analog converter means for converting said logic means present value, incremented values and final value digital signals to corresponding analog control levels having an instantaneous value of $V_c$; and
combiner means, being responsive to said analog control level $V_c$, for processing said generated signals $f_1$ and $f_2$ such that the amplitude of each is a predetermined function of said control signal $V_c$ and the combined amplitude of said signals $f_1$ and $f_2$ is said constant level K.

4. The apparatus of claim 3 wherein the logic means comprises:
counter means for storing the instantaneous value of said glideslope signal therein, said counter means being actuable to incrementally up or down count its stored value; and
comparator means for comparing said instantaneous glideslope signal, as stored in said counter means, with the desired final value, as stored in said final value register means, and, should said values differ, actuating said counter means, at the rate determined by said rate signal as stored in said rate register means, to incrementally count up or down such that said instantaneous value increments towards the desired value.

5. The apparatus of claim 3 wherein said logic means further comprises:
a fixed frequency rate oscillator producing a fixed frequency rate signal $f_r$;
divider means for dividing said signal $f_r$ by a divisor N producing a signal of frequency $f_r/N$, said divisor N being determined by the rate signal stored in the rate register means; and
means coupling said signal $f_r/N$ to said counter means to control the rate of incrementing thereof.

6. The apparatus of claim 3 wherein said combiner means comprises:
means for producing a signal $(K-V_c)$ equal to the difference between said constant level K and the value of said control signal $V_c$;
first multiplier means for multiplying said generated fixed level signal $f_1$ by the level of said control signal $V_c$;
second multiplier means for multiplying said generated fixed level signal $f_2$ by said signal $(K-V_c)$; and
means for summing the outputs of the first and second multipliers.

7. The apparatus of either of claims 1 or 2 wherein said localizer signal is comprised of the combination of a first signal $f_1$ of a first frequency and a second signal $f_2$ of a second frequency, with the sum of the amplitudes of said signals being a constant level, K, said localizer circuitry means comprising:
final value register means for receiving and retaining said localizer final value signal;
rate register means for receiving and retaining said localizer rate of approach signal;
logic means for retaining the present value of said localizer signal and digitally incrementing, at the rate determined by said rate register retained signal, to said final value as stored in said final value register;
digital to analog converter means for converting said logic means present value, incremental value and final value digital signals to corresponding analog control levels having an instantaneous value of $V_c$;
combiner means, being responsive to said analog control level $V_c$, for processing said generated signals $f_1$ and $f_2$ such that the amplitude of each is a predetermined function of said control signal $V_c$ and the combined amplitude of said signals $f_1$ and $f_2$ is said constant level K.

8. The apparatus of claim 7 wherein the logic means comprises:
counter means for storing the instantaneous value of said localizer signal therein, said counter means being actuable to incrementally up or down count its stored value; and
comparator means for comparing said instantaneous localizer signal, as stored in said counter means, with the desired final value, as stored in said final value register means, and, should said values differ, actuating said counter means, at the rate determined by said rate signal as stored in said rate register means, to incrementally count up or down such that said instantaneous value increments towards the desired value.

9. The apparatus of claim 7 wherein said logic means further comprises:
   a fixed frequency rate oscillator producing a fixed frequency rate signal $f_r$;
   divider means for dividing said signal $f_r$ by a divisor N producing a signal frequency $f_r/N$, said divisor N being determined by the rate signal stored in the rate register means; and
   means coupling said signal $f_r/N$ to said counter means to control the rate of incrementing thereof.

10. The apparatus of claim 7 wherein said combiner means comprises:
    means for producing a signal $(K-V_c)$ equal to the difference between said constant level K and the value of said control signal $V_c$;
    first multiplier means for multiplying said generated fixed level signal $f_1$ by the level of said control signal $V_c$;
    second multiplier means for multiplying said generated fixed level signal $f_2$ by said signal $(K-V_c)$; and
    means for summing the outputs of the first and secnd multipliers.

11. The apparatus in either of claims 1 or 2 wherein said VOR circuitry means comprises:
    final value register means for receiving and retaining said VOR final value signal:
    rate register means for receiving and retaining said VOR rate of approach signal;
    logic means for retaining the present value of said VOR signal and digitally incrementing, at the rate determined by said rate register retained signal, to said final value as stored in said final value register;
    switching means for activating predetermined switches in response to the status of said logic means; and
    generator means responsive to the status of said switching means for generating a predetermined VOR signal in response thereto.

12. The apparatus of claim 11 wherein the logic means comprises;
    counter means for storing the instantaneous value of said VOR signal therein, said counter means being actuable to incrementally up or down count its stored value; and
    comparator means for comparing said instantaneous VOR signal, as stored in said counter means, with the desired final value, as stored in said final value register means, and, should said values differ, actuating said counter means, at the rate determined by said rate signal as stored in said rate register means, to incrementally count up or down such that said instantaneous value increments towards the desired value.

13. The apparatus of claim 12 wherein said logic means further comprises:
    a fixed frequency rate oscillator producing a fixed frequency rate signal $f_r$;
    divider means for dividing said signal $f_r$ by a divisor N producing a signal of frequency $f_r/N$, said divisor being determined by the rate signal stored in the rate register means; and
    means for coupling said signal $f_r/N$ to said counter means to control the rate of incrementing thereof.

14. The apparatus of claim 11 further having the capability of automatically simulating aircraft marker beacon tones, each of said tones being representative of the distance of said aircraft from a reference site, the apparatus further comprising:
    the control means including means for generating a digital signal representative of a desired marker beacon tone;
    a marker beacon tone register means for storing said marker beacon tone therein; and
    means for coupling said stored marker beacon tone signal to said generator means causing said generator to produce the desired tone.

15. The apparatus of claim 14 further having the capability of automatically simulating aircraft marker beacon tones, each of said tones being representative of the distance of said aircraft from a reference site, the apparatus further comprising:
    the control means including means for generating a digital signal representative of a desired marker beacon tone;
    a marker beacon tone register means for storing said marker beacon tone therein; and
    means for coupling said stored marker beacon tone signal to said generator means causing said generator to produce the desired tone.

16. Apparatus for automatically simulating an aircraft glideslope or localizer signal, said signal being comprised of the combination of a first signal $f_1$ of a first frequency and a second signal $f_2$ of a second frequency, with the sum of the amplitudes of said signals being a constant level K, the apparatus comprising:
    control means for generating digital signals representative of the desired final value of the amplitudes of the signals $f_1$ and $f_2$ and the rate at which said final value should be approached;
    final value register means for receiving and retaining said final value signal;
    rate register means for receiving and retaining said rate signal;
    logic means for retaining the present value of said glideslope or localizer signal and digitally incrementing, at the rate determined by said rate register retained signal, to said final value as stored in said final value register;
    digital to analog converter means for converting said logic means present value, incremental values and final value digital signals to corresponding analog control levels having an instantaneous value of $V_c$;
    means for generator fixed levels of said signals $f_1$ and $f_2$; and
    combiner means, being responsive to said analog control level $V_c$, for processing said generated signals $f_1$ and $f_2$ such that the amplitude of each is a predetermined function of said control signal $V_c$ and the combined amplitude of said signals $f_1$ and $f_2$ is said constant level K.

17. The apparatus of claim 16 wherein the logic means comprises:
    counter means for storing the instantaneous value of said glideslope or localizer signal therein, said counter means being actuable to incrementally up or down count its stored value; and
    comparator means for comparing said instantaneous glideslope or localizer signal, as stored in said counter means, with the desired final value, as stored in said final value register means, and, should said values differ, actuating said counter means, at the rate determined by said rate signal as stored in said rate register means, to incrementally count up or down such that said instantaneous value increments towards the desired value.

18. The apparatus of claim 17 wherein said logic means further comprises:
a fixed frequency rate oscillator producing a fixed frequency rate signal $f_r$;
divider means for dividing said signal $f_r$ by a divisor N producing a signal of frequency $f_r/N$, said divisor N being determined by the rate signal stored in the rate register means; and
means coupling said signal $f_r/N$ to said counter means to control the rate of incrementing thereof.

19. The apparatus of claim 16 wherein said combiner means comprises:
means for producing a signal $(K-V_c)$ equal to the difference between said constant level K and the value of said control signal $V_c$;
first multiplier means for multiplying said generated fixed level signal $f_1$ by the level of said control signal $V_c$;
second multiplier means for multiplying said generated fixed level signal $f_2$ by said signal $(K-V_c)$; and
means for summing the outputs of the first and second multipliers.

20. Apparatus for automatically simulating an aircraft very high frequency, omnidirectional (VOR) guidance path signal comprising:
control means for generating digital signals representative of the desired final value VOR signal and of the rate at whch said final value should be approached;
final value register means for receiving and retaining said final value signal;
rate register means for receiving and retaining said rate signal;
logic means for retaining the present value of said VOR signal and digitally incrementing, at the rate determined by said rate register retained signal, to said final value as stored in said final value register;
switching means for activating predetermined switches in response to the status of said logic means; and
generator means responsive to the status of said switching means for generating a predetermined VOR signal in response thereto.

21. The apparatus of claim 20 wherein the logic means comprises:
counter means for storing the instantaneous value of said VOR signal therein, said counter means being actuable to incrementally up or down count its stored value;
comparator means for comparing said instantaneous VOR signal, as stored in said counter means, with the desired final value, as stored in said final value register means, and, should said values differ, actuating said counter means, at the rate determined by said rate signal as stored in said rate register means, to incrementally count up or down such that said instantaneous value increments towards the desired value.

22. The apparatus of claim 21 wherein said logic means further comprises:
a fixed frequency rate oscillator producing a fixed frequency rate signal $f_r$;
divider means for dividing said signal $f_r$ by a divisor N producing a signal of frequency $f_r/N$, said divisor N being determined by the rate signal stored in the rate register means; and
means coupling said signal $f_r/N$ to said counter means to control the rate of incrementing thereof.

* * * * *